UNITED STATES PATENT OFFICE.

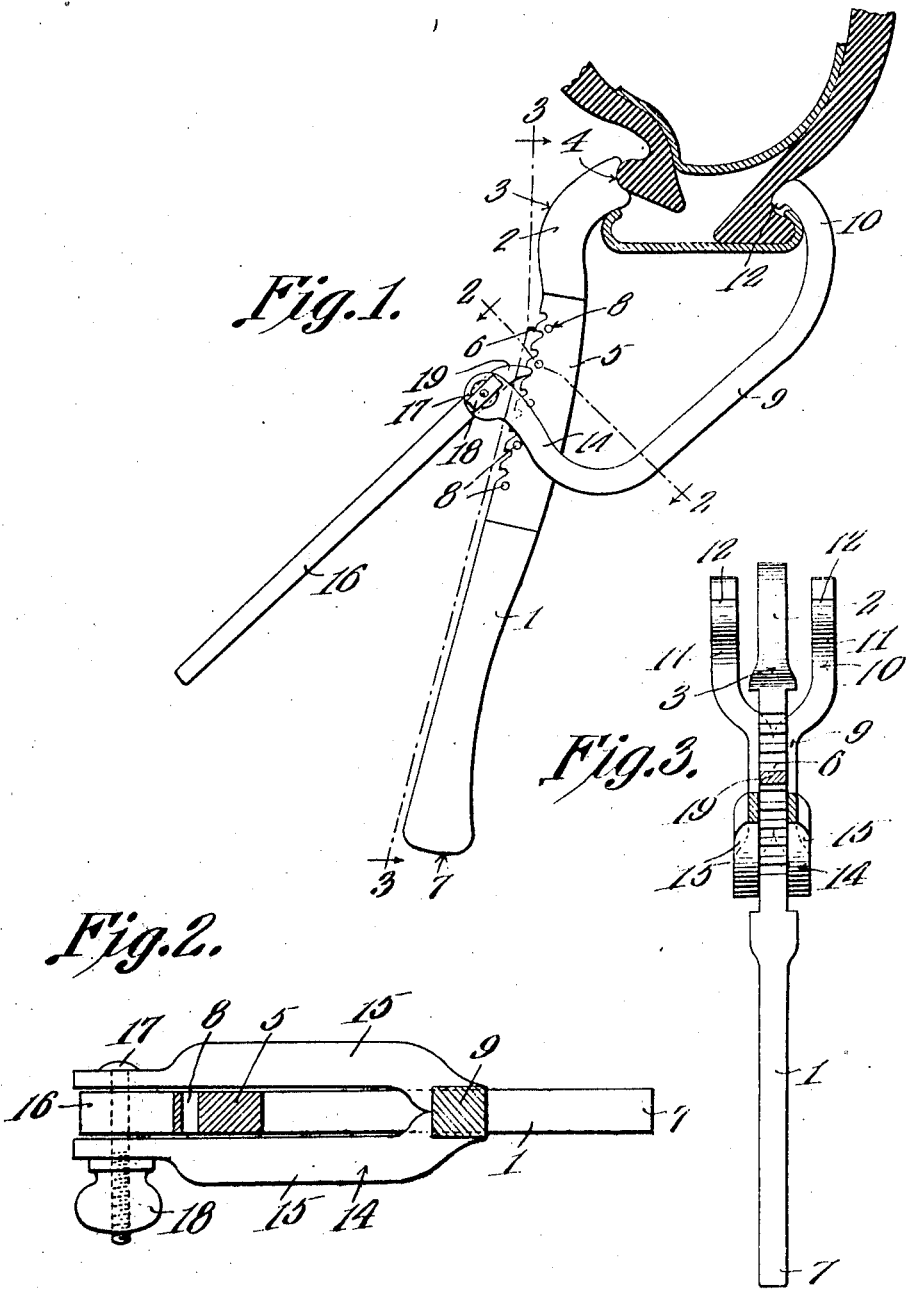

JOHN H. BLAKE, OF PORTLAND, OREGON, ASSIGNOR OF ONE-HALF TO LEWIS B. DAVIDSON, OF IONE, OREGON.

TIRE-TOOL.

1,031,233.      Specification of Letters Patent.      Patented July 2, 1912.

Application filed October 9, 1911. Serial No. 653,594.

*To all whom it may concern:*

Be it known that I, JOHN H. BLAKE, a citizen of the United States, residing at Portland, in the county of Multnomah and State of Oregon, have invented a new and useful Tire-Tool, of which the following is a specification.

The device forming the subject-matter of this application, is a tool adapted to be employed for placing pneumatic tires upon vehicle rims, and for removing the tires from the rims.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in side elevation; Fig. 2 is a section upon the line 2—2 of Fig. 1; and Fig. 3 is a section on the line 3—3 of Fig. 1.

In carrying out the invention there is provided a primary lever 1, one end 2 of which is reversely curved, as shown at 3, the extremity of the portion 2 being provided with a depression or seat 4, adapted to engage the rib of the tire. The intermediate portion of the primary lever 1 is flattened, as shown at 5, and upon the outer edge of this flattened portion 5 there are ratchet teeth 6, inclined toward the handle end 7 of the lever. Extended longitudinally of the primary lever 1 is a series of openings 8, these openings 8 being located opposite the bases of the teeth 6.

The invention further includes an arched rim hook 9, one end 10 of which is provided with arms 11 terminating in angularly disposed lugs 12. The other end 14 of the arched rim hook 9 terminates in arms 15, these arms 15 extending across the flattened portion 5 of the primary lever 1.

Disposed between the arms 15 of the rim hook 9 is a secondary lever 16. A bolt 17 or like connecting element is passed through the arms 15 of the rim hook 9, and through the secondary lever 16, adjacent one end of the said lever, the major portion of the secondary lever 16 extending free in the general direction of the handled end 7 of the primary lever 1. The bolt 17 is headed at one end, the other, threaded end of the bolt carrying a wing nut 18. That end of the secondary lever 16 which is closest to the pivotal mounting 17 of the lever, terminates in a curved pawl 19, adapted to engage with the ratchet teeth 6 of the primary lever 1. The construction is such that the bolt 17 may be disconnected from the secondary lever 16, whereupon the bolt may be inserted into any of the openings 8 in the primary lever 1, for the purpose of connecting the rim hook 9 directly to the lever 1.

Having thus described the invention, what is claimed is:—

1. A device of the class described comprising a primary lever; a rim hook extended transversely of the primary lever; and a secondary lever fulcrumed intermediate its ends in the hook and having a step by step engagement with the primary lever.

2. A device of the class described comprising a primary lever; a rim hook extended transversely of the primary lever; a secondary lever having a step by step engagement with the primary lever; and a pin pivotally connecting the secondary lever with the hook; there being openings in the primary lever, adapted to receive the pin, to connect the hook directly with the primary lever, when the secondary lever is removed from the hook.

3. A device of the class described comprising a primary lever provided with ratchet teeth in its edge; a rim hook having arms straddling, and extending across the primary lever; a secondary lever located between the arms of the hook, and having a pawl adapted to engage with the ratchet teeth; and a pin extended through the arms and through the secondary lever, there being openings in the primary lever adjacent the ratchet teeth, in which openings the pin may be placed, to connect the hook directly with the primary lever, when the secondary lever is removed from the hook.

In testimony that I claim the foregoing as my own, I have hereto affixed my signature in the presence of two witnesses.

JOHN H. BLAKE.

Witnesses:
    LAURA V. BULKELEY,
    F. W. FIELDHOUSE.